(12) United States Patent
Burmester

(10) Patent No.: US 11,969,748 B2
(45) Date of Patent: Apr. 30, 2024

(54) LIQUID DISPENSING SYSTEMS WITH REDUCED NOISE LEVELS

(71) Applicant: NORDSON CORPORATION, Westlake, OH (US)

(72) Inventor: Thomas Burmester, Bleckede (DE)

(73) Assignee: Nordson Corporation, Westlake, OH (US)

(*) Notice: Subject to any disclaimer, the term of this patent is extended or adjusted under 35 U.S.C. 154(b) by 0 days.

(21) Appl. No.: 17/619,836

(22) PCT Filed: Jun. 19, 2020

(86) PCT No.: PCT/US2020/038597
§ 371 (c)(1),
(2) Date: Dec. 16, 2021

(87) PCT Pub. No.: WO2020/257556
PCT Pub. Date: Dec. 24, 2020

(65) Prior Publication Data
US 2022/0314266 A1   Oct. 6, 2022

Related U.S. Application Data

(60) Provisional application No. 62/864,466, filed on Jun. 20, 2019.

(51) Int. Cl.
*F16K 31/122* (2006.01)
*B05C 5/00* (2006.01)
(Continued)

(52) U.S. Cl.
CPC ............ *B05C 5/0237* (2013.01); *B05C 5/001* (2013.01); *F16K 31/1221* (2013.01); *F16K 31/124* (2013.01)

(58) Field of Classification Search
CPC .... B05C 5/0237; B05C 5/001; F16K 31/1221
See application file for complete search history.

(56) References Cited

U.S. PATENT DOCUMENTS 4,360,132 A    11/1982   Vilagi et al.
7,156,261 B2*   1/2007   Saidman ................ B05B 15/65
                                                  222/504
(Continued)

FOREIGN PATENT DOCUMENTS

CN         202302103 U    7/2012
DE      102015005489 A1   11/2016
(Continued)

OTHER PUBLICATIONS

ISA/220—Notification of Transmittal or Search Report and Written Opinion of the ISA, or the Declaration dated Oct. 1, 15, 2020 for WO Application No. PCT/US20/038597.
(Continued)

*Primary Examiner* — Umashankar Venkatesan
(74) *Attorney, Agent, or Firm* — BakerHostetler

(57) ABSTRACT

Systems and methods for dispensing a liquid onto a substrate are disclosed. A dispensing assembly includes a housing, a valve stem, and a control valve. The housing receives the liquid to be dispensed. The valve stem is disposed in the housing and has a first configuration, in which the liquid is allowed to exit the housing, and a second configuration, in which the liquid is prevented from exiting the housing. The control valve receives pressurized air from a pressurized air source. The control valve has a first position, in which the pressurized air acts on the valve stem to move the valve stem to the first configuration or to the second configuration, and a second position, in which the pressurized air is moved out of the dispensing assembly through an exhaust passage defined therein.

57 Claims, 10 Drawing Sheets

(51) Int. Cl.
*B05C 5/02* (2006.01)
*F16K 31/124* (2006.01)

(56) References Cited

U.S. PATENT DOCUMENTS

| | | | |
|---|---|---|---|
| 7,857,173 B2 * | 12/2010 | Bolyard, Jr. | F16K 31/124 |
| | | | 285/305 |
| 9,889,463 B2 * | 2/2018 | Ikushima | B05C 11/1034 |
| 10,150,134 B2 * | 12/2018 | Saine | B05B 7/0416 |
| 10,272,464 B2 * | 4/2019 | Saine | B05C 11/1026 |
| 2005/0236438 A1 * | 10/2005 | Chastine | B05C 5/001 |
| | | | 251/238 |
| 2006/0097010 A1 * | 5/2006 | Riney | B05C 5/001 |
| | | | 222/146.5 |
| 2012/0260993 A1 | 10/2012 | Penning | |
| 2013/0105524 A1 * | 5/2013 | Saine | F16K 31/1262 |
| | | | 222/504 |
| 2014/0361203 A1 | 12/2014 | Saine | |

FOREIGN PATENT DOCUMENTS

| | | |
|---|---|---|
| EP | 0040527 A1 | 11/1981 |
| EP | 1652588 A1 | 5/2006 |
| EP | 2586535 A2 | 5/2013 |
| WO | 2013/062953 A1 | 5/2013 |
| WO | WO-2017213920 A1 * | 12/2017 |

OTHER PUBLICATIONS

Third party observation dated Jan. 12, 2021 for WO Application No. PCT/US20/038597, 5 page(s).

* cited by examiner

A-A

LIQUID DISPENSING SYSTEMS WITH REDUCED NOISE LEVELS

CROSS REFERENCE TO RELATED APPLICATIONS

This application is a National Stage Application of International Patent App. No. PCT/US2020/038597, filed Jun. 19, 2020, which claims the benefit of U.S. Provisional Patent App. No. 62/864,466, filed Jun. 20, 2019, the entire disclosures of both of which are hereby incorporated by reference as if set forth in their entirety herein.

TECHNICAL FIELD

This disclosure generally relates to devices and methods of dispensing liquids onto substrates, and more particularly relates to a new design for a pneumatically actuated dispensing valve for dispensing hot melt adhesive.

BACKGROUND

In existing pneumatically actuated liquid dispensing systems, such as those designed to dispense liquid hot melt adhesives, pressurized air is often used to actuate one or more components to cause the liquid to be dispensed onto a substrate. An air supply device, such as an electrically operated solenoid valve, has been used to supply and switch the actuating air. When the solenoid is electrically activated to supply pressurized air to the liquid dispensing valve, the pressurized air acts against an actuator, such as a movable piston or diaphragm. This opens the liquid dispensing valve.

In some conventional dispensing systems, when the pressurized air leaves the dispensing system, the movement of air results in high noise output, which negatively affects manufacturing conditions. Some existing systems implement a noise reducing component, such as a muffler, to help reduce the noise of the air leaving the systems. These mufflers get clogged and damaged during use over time and are not always desirable.

Therefore, there is a need for an improved structure of dispensing systems that operate with less noise while maintaining consistent dispensing of liquid.

SUMMARY

There are shortcomings with the conventional dispensing systems. When the pressurized air leaves the dispensing system, the movement of air results in high noise output. Communication between users is more difficult due to the high noise level and can lead to missed instructions or miscommunications on the manufacturing floor. Users may also have to wear protective equipment to shield their ears from the noise, which may also adversely affect communication and be less convenient to the users.

Some existing systems implement a noise reducing component, such as a muffler, to help reduce the noise of the air leaving the systems, but these mufflers get clogged and damaged during use over time. The mufflers have to be cleaned or replaced consistently, which increases downtime, reduces manufacturing efficiency, and requires more money spent on replacement components and for man-hours lost to the cleaning or replacement process. As the mufflers clog, they also allow lower flow rates of the air through them, which results in inconsistent and difficult-to-predict dispensing progressions. Therefore, there is a need for an improved structure of dispensing systems that results in decreased noise production while maintaining consistent dispensing of liquid.

The foregoing needs are met by the various aspects of dispensing assemblies disclosed. According to an aspect of the disclosure, a dispensing assembly for dispensing a liquid onto a substrate includes a housing configured to receive the liquid to be dispensed; a valve stem disposed in the housing and having a first configuration in which the liquid is allowed to exit the housing and a second configuration in which the liquid is prevented from exiting the housing; a control valve configured to receive pressurized air from a pressurized air source, the control valve being movable between a first position and a second position; and an exhaust passage defined on the housing and having a predetermined cross-sectional area, the exhaust passage being configured to receive the pressurized air therein. When the control valve is in the first position, the pressurized air is configured to act on the valve stem to cause the valve stem to move to the first configuration or to the second configuration, and when the control valve is in the second position, the pressurized air is configured to be moved into the exhaust passage and out of the dispensing assembly through the exhaust passage.

Optionally, when the control valve is in the first position, the control valve may be configured to be in fluid communication with a first chamber and may be configured to direct the pressurized air to the first chamber. In some aspects, the dispensing assembly may further include a first channel being disposed between the first chamber and the control valve, the first channel being in fluid communication with the first chamber, and the first channel being in fluid communication with the control valve when the control valve is in the first position. When the control valve is in the first position, the control valve may be configured to receive the pressurized air from the pressurized air source and to discharge the pressurized air into the first channel.

Optionally, when the control valve is in the second position, the control valve may be configured to be in fluid communication with a second chamber that is separate from the first chamber, and may be further configured to direct the pressurized air to the second chamber. The exhaust passage may be configured to fluidly communicate with the second chamber. In some aspects, the dispensing assembly may further include a second channel being disposed between the second chamber and the control valve, the second channel being in fluid communication with the second chamber, and the second channel being in fluid communication with the control valve when the control valve is in the second position. When the control valve is in the second position, the first chamber may be in fluid communication with the second chamber via the first channel, the second channel, and the control valve. When the control valve is in the second position, the control valve may be configured to receive the pressurized air from the first chamber through the first channel and to discharge the pressurized air into the second channel.

Optionally, when the control valve is in the second position, the control valve may be configured to prevent the pressurized air from moving from the pressurized air source to either the first chamber or the second chamber.

Optionally, when the control valve is in the first position, the pressurized air source may be not in fluid communication with the second channel.

Optionally, when the control valve is in the second position, the pressurized air source may be not in fluid communication with either the first channel or the second channel.

Optionally, the dispensing assembly may include a valve seat defined on the housing, wherein the valve stem is configured to move relative to the valve seat, such that when the valve stem is in the first configuration, the valve stem is spaced away from the valve seat, and when the valve stem is in the second configuration, the valve stem contacts the valve seat.

Optionally, the control valve may be a solenoid valve.

Optionally, the pressure of the pressurized air may be between 1 bar and 10 bar. In some aspects, the pressure may be between 3 bar and 8 bar. In some aspects, the pressure may be between 5 bar and 6 bar. In some preferred embodiments, the pressure may be about 5.5 bar.

Optionally, the exhaust passage may be oriented at an angle between parallel to the valve stem and perpendicular to the valve stem.

Optionally, the exhaust passage may have a cross-sectional diameter of between 0.1 mm and 3.0 mm. In some aspects, the cross-sectional diameter may be between 0.5 mm and 2.5 mm. In some aspects, the cross-sectional diameter may be between 1.0 mm to 2.0 mm. In some aspects, the cross-sectional size may be about 1.5 mm.

Optionally, the dispensing assembly may define a plurality of exhaust passages. In some aspects, the predetermined cross-sectional area may include the combined cross-sectional area of all exhaust passages in the plurality of exhaust passages. In some aspects, the dispensing assembly may include four exhaust passages. Optionally, the four exhaust passages may be arranged circumferentially around the dispensing assembly.

Optionally, the dispensing system may further include a spring configured to bias the valve stem in a direction, wherein the valve stem is movable by the pressurized air opposite the direction of bias of the spring.

Optionally, dispensing assembly may be devoid of a muffler operationally attached thereto.

According to another aspect of the disclosure, a dispensing system for dispensing a liquid onto a substrate includes a liquid source configured to hold the liquid to be dispensed; a dispensing assembly having a housing configured to receive the liquid from the liquid source, the dispensing assembly further having a valve stem movable within the housing between a first configuration, in which the liquid is allowed to exit the housing, and a second configuration, in which the liquid is prevented from exiting the housing; a pressurized air source configured to hold pressurized air; a control valve configured to receive pressurized air from the pressurized air source, the control valve being movable between a first position and a second position; and an exhaust passage defined on the housing and having a predetermined cross-sectional area, the exhaust passage being configured to receive the pressurized air therein. When the control valve is in the first position, the pressurized air is configured to act on the valve stem to cause the valve stem to move to the first configuration or to the second configuration, and when the control valve is in the second position, the pressurized air is configured to be moved into the exhaust passage and out of the dispensing assembly through the exhaust passage.

Optionally, the liquid may be hot melt adhesive.

Optionally, the dispensing system may include a heater configured to heat the liquid to a predetermined temperature.

Optionally, the dispensing system may include a process air source configured to contain process air; and a supply channel through which the process air is moved from the process air source, the supply channel having a process air nozzle disposed relative to the dispensing assembly such that the process air can be applied to the liquid being dispensed from the dispensing assembly.

Optionally, when the control valve is in the first position, the control valve may be configured to be in fluid communication with a first chamber and configured to direct the pressurized air to the first chamber. In some aspects, the dispensing system may include a first channel being disposed between the first chamber and the control valve, the first channel being in fluid communication with the first chamber, and the first channel being in fluid communication with the control valve when the control valve is in the first position. When the control valve is in the first position, the control valve may be configured to receive the pressurized air from the pressurized air source and to discharge the pressurized air into the first channel.

Optionally, when the control valve is in the second position, the control valve may be configured to be in fluid communication with a second chamber that is separate from the first chamber, and is further configured to direct the pressurized air to the second chamber. The exhaust passage may be configured to fluidly communicate with the second chamber. In some aspects, the dispensing assembly may include a second channel being disposed between the second chamber and the control valve, the second channel being in fluid communication with the second chamber, and the second channel being in fluid communication with the control valve when the control valve is in the second position. When the control valve is in the second position, the control valve may be configured to receive the pressurized air from the first chamber through the first channel and to discharge the pressurized air into the second channel.

Optionally, when the control valve is in the second position, the control valve may be configured to prevent the pressurized air from moving from the pressurized air source to either the first chamber or the second chamber.

Optionally, when the control valve is in the first position, the pressurized air source may be not in fluid communication with the second channel.

Optionally, when the control valve is in the second position, the pressurized air source may be not in fluid communication with either the first channel or the second channel.

Optionally, the dispensing assembly may include a valve seat defined on the housing, wherein the valve stem is configured to move relative to the valve seat, such that when the valve stem is in the first configuration, the valve stem is spaced away from the valve seat, and when the valve stem is in the second configuration, the valve stem contacts the valve seat.

Optionally, the control valve may be a solenoid valve.

Optionally, the pressure of the pressurized air may be between 1 bar and 10 bar. In some aspects, the pressure may be between 3 bar and 8 bar. In some aspects, the pressure may be between 5 bar and 6 bar. In some preferred embodiments, the pressure may be about 5.5 bar.

Optionally, the exhaust passage may be oriented at an angle between parallel to the valve stem and perpendicular to the valve stem.

Optionally, the exhaust passage may have a cross-sectional diameter of between 0.1 mm and 3.0 mm. In some aspects, the cross-sectional diameter may be between 0.5 mm and 2.5 mm. In some aspects, the cross-sectional diameter may be between 1.0 mm to 2.0 mm. In some aspects, the cross-sectional size may be about 1.5 mm.

Optionally, the dispensing assembly may define a plurality of exhaust passages. In some aspects, the predetermined cross-sectional area may include the combined cross-sectional area of all exhaust passages in the plurality of exhaust passages. In some aspects, the dispensing assembly may define four exhaust passages. In some aspects, the four exhaust passages may be arranged circumferentially around the dispensing assembly.

Optionally, the dispensing assembly may include a spring configured to bias the valve stem in a direction, wherein the valve stem is movable by the pressurized air opposite the direction of bias of the spring.

Optionally, the dispensing assembly may be devoid of a muffler operationally attached thereto.

According to another aspect of the disclosure, a dispensing assembly for dispensing a liquid onto a substrate includes a dispensing portion having a liquid inlet and a liquid outlet, the dispensing portion defining a liquid chamber configured to receive the liquid therein from the liquid inlet; a valve seat adjacent to the liquid outlet; a valve stem disposed in the liquid chamber and configured to move within the liquid chamber; a valve stem tip defined at a distal end of the valve stem and configured to selectively contact the valve seat and be spaced away from the valve seat; an actuation portion having an air inlet configured to receive pressurized air therethrough, the actuation portion defining a first chamber and a second chamber; a piston disposed in the actuation portion, the piston being movable by the pressurized air; a control valve configured to direct the pressurized air selectively either to the first chamber or to the second chamber; and an exhaust passage configured to discharge the pressurized air therethrough from the dispensing assembly. The control valve has a first configuration and a second configuration, the control valve in the first configuration being configured to direct the pressurized air to the first chamber, the control valve in the second configuration being configured to direct the pressurized air to the second chamber. When the control valve is in the first configuration, the pressurized air in the first chamber is configured to act on the piston and configured to cause the piston to move in a first direction due to the pressurized air acting thereon. When the control valve is in the second configuration, the exhaust passage is configured to receive the pressurized air therein and to discharge the pressurized air out of the dispensing assembly.

Optionally, the exhaust passage may have a predetermined cross-sectional area.

Optionally, the dispensing assembly may include a spring configured to bias the piston in a second direction opposite the first direction, wherein when the pressurized air is moved into the first chamber, the pressurized air is configured to cause the piston to move in the first direction when a threshold pressure of the pressurized air is reached, the threshold pressure being greater than the bias of the spring.

Optionally, the control valve may be a solenoid valve having a poppet movable between a first position and a second position, wherein when the poppet is in the first position, the control valve is in the first configuration, and when the poppet is in the second position, the control valve is in the second configuration.

Optionally, the liquid outlet may be blocked when the valve stem tip is in contact with the valve seat, such that the liquid is prevented from moving out of the dispensing assembly, and where the liquid outlet is unblocked when the valve stem tip is spaced away from the valve seat, such that the liquid is allowed to be moved out of the dispensing assembly.

Optionally, the dispensing assembly may include a plurality of exhaust passages, wherein the quantity and dimensions of the plurality of exhaust passages reduces noise of operation of the dispensing assembly relative to a single exhaust passage. In some aspects, the predetermined cross-sectional area may include the combined cross-sectional area of all exhaust passages in the plurality of exhaust passages.

Optionally, the dispensing assembly may be devoid of a muffler.

According to another aspect of the disclosure, a method of dispensing a liquid from a dispensing assembly includes introducing liquid to be dispensed into a liquid chamber, the liquid chamber including a movable valve stem configured to move between a first position, in which liquid is precluded from being discharged out of the liquid chamber, and a second position, in which liquid is permitted to be discharged from the liquid chamber; introducing pressurized air into a first chamber via a control valve so as to cause the valve stem to move from the first position to the second position due to the pressurized air; ceasing introduction of the pressurized air into the first chamber; and moving the pressurized air out of the dispensing assembly.

Optionally, introducing pressurized air into the first chamber may cause movement of a piston affixed to the valve stem, such that when the piston moves, the valve stem moves.

Optionally, introducing pressurized air into the first chamber may include introducing the pressurized air into a first channel configured to fluidly communicate with the control valve and with the first chamber.

Optionally, the step of moving the pressurized air out of the dispensing assembly may include moving the pressurized air from the first chamber to a second chamber separated from the first chamber.

Optionally, moving the pressurized air out of the dispensing assembly may include moving the pressurized air into a second channel configured to fluidly communicate with the control valve and the second chamber. In some aspects, the step of moving the pressurized air out of the dispensing assembly may further include moving the pressurized air from the second chamber out of the dispensing assembly via an exhaust passage. In some aspects, the step of moving the pressurized air out of the second chamber may include moving the pressurized air out of a plurality of exhaust passages.

Optionally, the step of moving the pressurized air out of the dispensing assembly may include discharging the air directly to the atmosphere from the dispensing assembly without moving the pressurized air through a muffler.

Optionally, the method may further include moving the valve stem from the second position back to the first position. In some aspects, moving the valve stem back to the first position may include forcing the valve stem into the first position with a spring configured to act on the valve stem.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In the drawings.

Aspects of the disclosure will now be described in detail with reference to the drawings, wherein like reference numbers refer to like elements throughout, unless specified otherwise.

DETAILED DESCRIPTION OF ILLUSTRATIVE EMBODIMENTS

Liquid can be dispensed from a dispensing head by actuating a movable component to open or close an outlet of the dispensing head. The liquid, for example a hot-melt adhesive, is supplied to the dispensing head from a liquid source, is moved through the dispensing head, and discharged from the outlet of the dispensing head onto a substrate. The rate of discharging and the pattern of discharging can be predetermined and controlled by a user, an electronic controller, or both. It will be understood that various discharging rates and patterns of discharging can be achieved, and that different liquids may be discharged from the dispensing heads disclosed here.

The movement of the movable component may be controlled by pressurized air that is received in the dispensing head from an air source. An electrically operated air supply device can interact with various air passageways to direct the flow of pressurized air.

Figure 1:
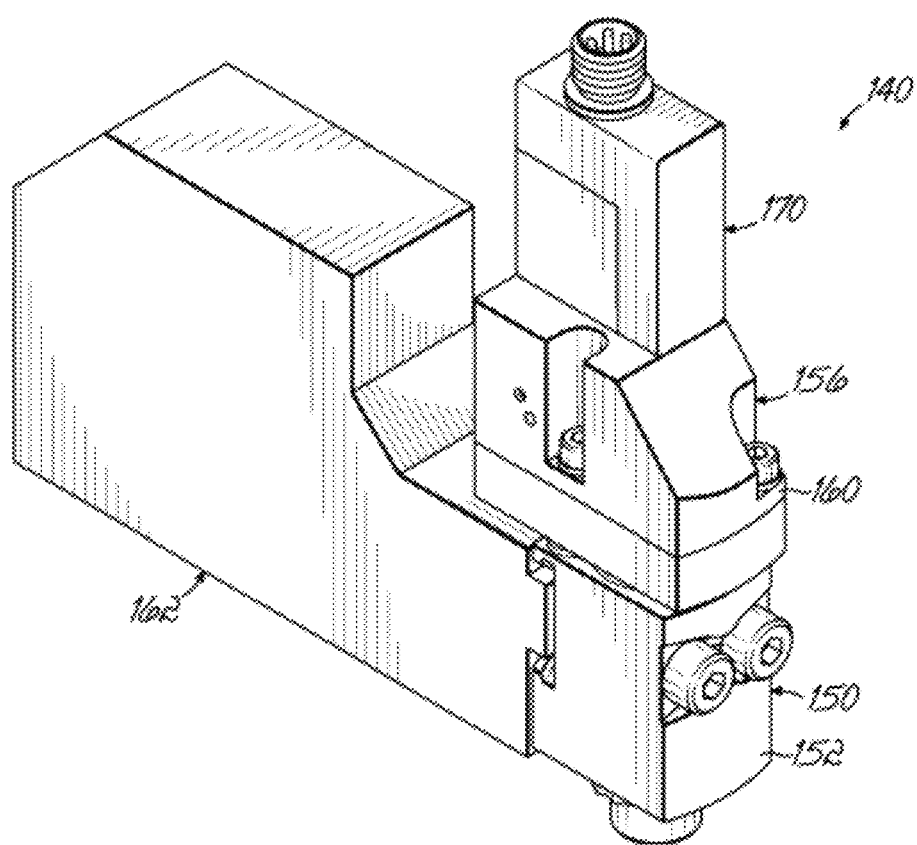
FIG. 1 illustrates a perspective view of a dispensing assembly having a manifold and a liquid dispensing valve according to an aspect of the disclosure.
Figure 2:
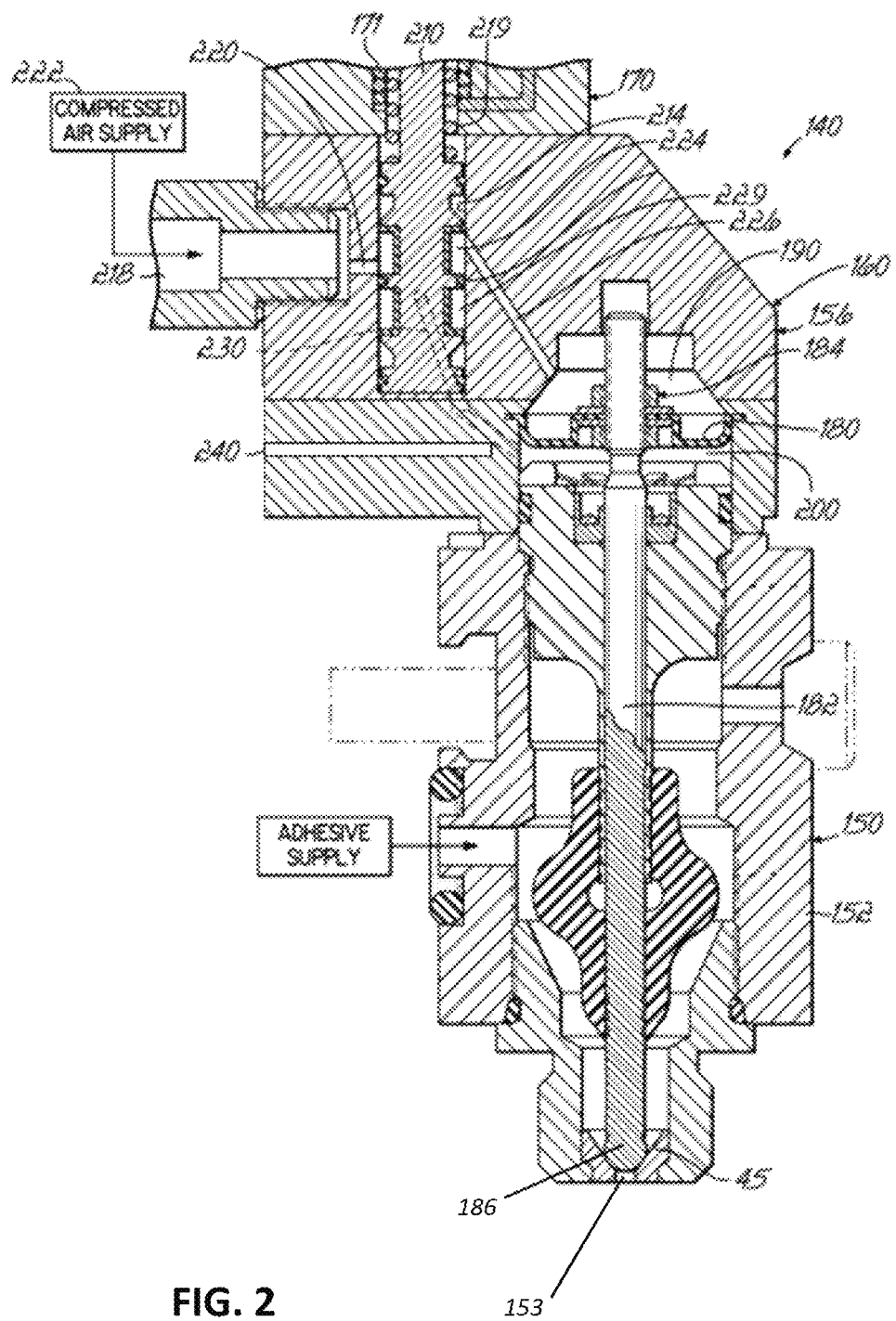
FIG. 2 illustrates a side cross-sectional view of a liquid dispensing valve in a closed position.
Figure 3:
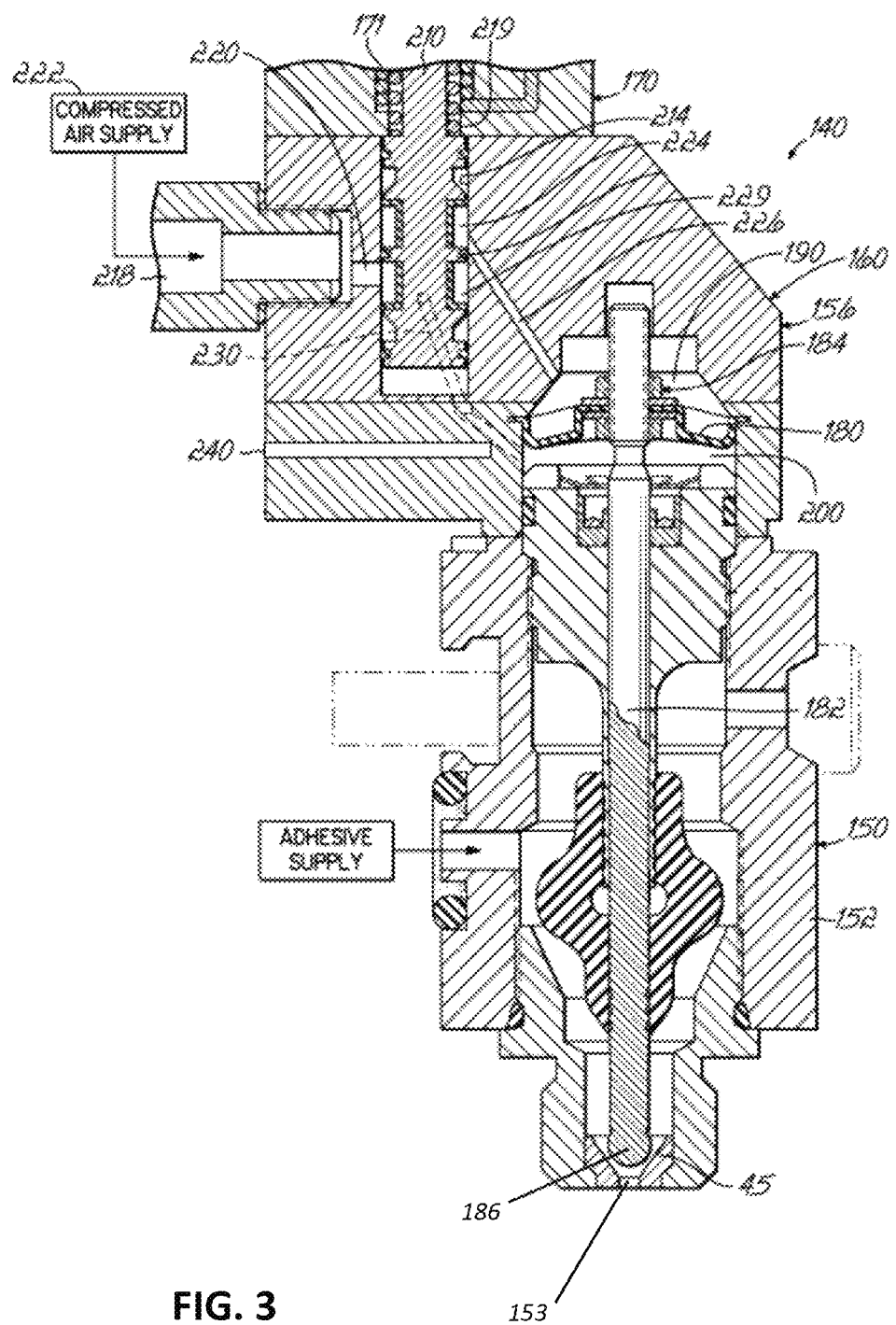
FIG. 3 illustrates a side cross-sectional view of the liquid dispensing valve of FIG. 2 in an open position.

Referring to FIGS. 1-3, a dispensing assembly is depicted having a liquid dispensing valve 140 and a manifold 162 configured to receive air and the liquid to be dispensed. The manifold 162 may be heated and used to supply liquid hot melt adhesive and process or pattern air to the attached liquid dispensing valve 140. It will be appreciated that the liquid dispensing valve 140 and the manifold 162 may be integrated together or coupled in any desired manner. In some aspects, process or pattern air may be used to impart a number of patterns, for example a swirl motion, to the discharged or extruded liquid, for example, to hot-melt adhesive. This may be accomplished in various known manners.

The liquid dispensing valve 140 includes a liquid dispensing portion 150 having a valve body 152. The valve body 152 includes components configured to open and close an outlet 153 defined on the valve body 152. When the outlet 153 is open, the liquid is permitted to flow, drip, or be forcefully jetted out of the dispensing assembly; when the outlet 153 is closed, liquid is prevented from leaving the dispensing assembly. The actuation of valve components and the opening and closing of the outlet 153 can be accomplished in a variety of ways and may utilize different dispensing mechanisms and techniques. Although exemplary aspects described herein reference specific structures and methods of operating a valve to open or close the outlet 153, this disclosure is not intended to be limited to any specific method or structure of a valve.

The liquid dispensing valve 140 further includes an actuation portion 156, which includes an upper housing 160. A gas used to actuate one or more valve components is introduced into the upper housing. The gas can be compressed or pressurized gas, for example, pressurized air. A gas control valve may be a solenoid valve 170 and may be connected to the upper housing 160. The solenoid valve 170 may be configured to direct or obstruct passage of the gas introduced into the actuation portion 156. While the exemplary aspects depicted herein reference a solenoid valve, it will be understood that other suitable valves may be utilized.

The liquid dispensing valve 140 further includes a pneumatic actuator that, when actuated, results in opening or closing the outlet 153. In some aspects, actuation of the pneumatic actuator may further result in other or additional actions, such as forcefully jetting a portion of the liquid out of the outlet 153. The pneumatic actuator may be any suitable mechanism, such as a differential piston affixed to a valve member, and this disclosure is not limited to a particular structure of a pneumatic actuator or its integration with other components of the dispensing assembly.

Referring to the exemplary aspect depicted in FIGS. 1-3, the pneumatic actuator may be a diaphragm 180. The upper housing 160 defines an upper chamber 190 and a lower chamber 200 separated from the upper chamber 190 by the diaphragm 180. It will be appreciated that the separation between the upper chamber 190 and the lower chamber 200 is advantageously fluid-tight, and the diaphragm 180 may include a suitable sealing element thereon, such as an O-ring, to maintain the fluid-tight seal.

The diaphragm 180 is fixedly coupled to a valve stem 182 using a suitable fastening assembly 184. In operation, the diaphragm 180 is actuated to move in a first direction or a second direction opposite the first direction. When the diaphragm 180 moves, the rigidly coupled valve stem 182 also moves. The valve stem 182 defines a valve stem tip 186 at a distal end of the valve stem 182. The valve stem tip 186 is configured to move relative to and contact a valve seat 45 adjacent to the outlet 153. When the valve stem tip 186 is in contact with the valve seat 45, the outlet 153 is closed, thus preventing the liquid from moving out of the dispensing assembly. When the valve stem tip 186 is spaced away from the valve seat 45, the outlet 153 is open, thus permitting the liquid to move or be moved out of the dispensing assembly.

Movement of the diaphragm 180 may be caused by pressurized air that is introduced into the upper housing 160, for example into the upper chamber 190. When pressurized air is introduced into an upper chamber 190 and against the diaphragm 180, this pushes the diaphragm 180 and the attached valve stem 182 to the closed position as shown in FIG. 2. In this closed position, the valve stem tip 186 contacts the valve seat 45 such that the outlet 153 is closed. It will be understood that various other actuator designs may be used instead. Pressurized air may be at "shop" pressure of approximately 5.5 bar (about 80 psi), but it will be understood that other pressures may be utilized. In some aspects, the pressure may be between about 1 bar and about 10 bar, about 3 bar and about 8 bar, or about 5 bar and about 6 bar.

When pressurized air is instead introduced into the lower chamber 200, the diaphragm 180 and the attached valve stem 182 are pushed upward into an open position as shown in FIG. 3. In this open position, the valve stem tip 186 is spaced away from the valve seat 45 such that the outlet 153 is open.

The route and destination of the pressurized air may be controlled by the solenoid valve 170. Pressurized air is introduced into an air inlet 218 from a pressurized air source 222. The pressurized air moves from the air inlet 218 through an air inlet passage 220 towards a movable element or poppet 210 that is movable within a channel 214. The poppet 210 extends into the channel 214, either partially or completely incorporated into the upper housing 160.

The solenoid valve 170 may include a spring 219 and a coil 171. The spring 219 applies a biasing force to the poppet 210 in a particular direction. The coil 171 may be energized by an external source. The poppet 210 may be have a first position and a second position different from the first position. Referring to FIG. 2, the coil 171, which may be implemented as a solenoid coil, is not energized, and the spring 219 applies a biasing force on the poppet 210 to move the poppet 210 farther into the channel 214 to the first position. When the poppet 210 is in the first position, a first annular recess 224 defined in the poppet 210 is in alignment and in fluid communication with the air inlet passage 220. The first annular recess 224 is also in fluid communication with a first passage 226 defined in the upper housing 160, which fluidly communicates with the upper chamber 190. Thus, the pressurized air from the air inlet passage 220 may move into and through the first annular recess 224, through the first passage 226, and into the upper chamber 190.

When the coil 171 is energized, the poppet 210 is moved against the force of the spring 219 into the second position. Referring to FIG. 3, when the poppet 210 is in the second position, a second annular recess 229 defined in the poppet 210 is in alignment and in fluid communication with the air inlet passage 220, while the first annular recess 224 is not in fluid communication with the air inlet passage 220. The second annular recess 229 is also in fluid communication with a second passage 230 defined in the upper housing 160, which fluidly communicates with the lower chamber 200. Thus, the pressurized air from the air inlet passage 220 may move into and through the second annular recess 229, through the second passage 230, and into the lower chamber 200. As shown in FIG. 3, when the poppet 210 is in the second position, the diaphragm 180 and the rigidly attached valve stem 182 are forced by the pressurized air to move to the open position, such that the valve stem tip 186 is moved away from the valve seat 45 and the outlet 153 is opened.

When the poppet 210 is in the first position shown in FIG. 2, the lower chamber 200, the second passage 230, and the second annular recess 229 may communicate with an exhaust passage 240. The exhaust passage 240 may lead to another component of the dispensing assembly or to the atmosphere. Similarly, when the poppet 210 is in the second position shown in FIG. 3, the upper chamber 190, the first passage 226, and the first annular recess 224 may communicate with the exhaust passage 240. The pressurized air may leave the dispensing assembly via the exhaust passage 240. This aspect illustrates the principle of having the poppet 210 of the solenoid valve 170 at least partially contained within the actuation portion 156, such as at least partially within the upper housing 160 of the liquid dispensing valve 140, thereby enabling a significant reduction in the total pressurized air volume and improving valve actuation speed and performance.

Although the illustrative aspects of FIGS. 2 and 3 describe the outlet 153 being open when the coil 171 of the solenoid valve 170 is energized and closed when the coil 171 is not energized, it will be understood that a reverse structure can be implemented, in which energizing the coil 171 would close the outlet 153 and de-energizing the coil 171 would open the outlet 153.

In some aspects, the upper housing 160 may be formed from a thermally insulating material, such as plastic or ceramic or another nonmetallic insulating material (e.g., PPS). The term "nonmetallic" as used herein is meant to encompass materials having no metal whatsoever, for example, plastics or the like or composites that may have small amounts of metal such as fibers, for example, to add strength but that comprise primarily non-metal material. In this latter case, the thermal conductivity of the thermally insulating housing will be less than that which would exist if the housing was made entirely or primarily from the metal.

Figure 4:
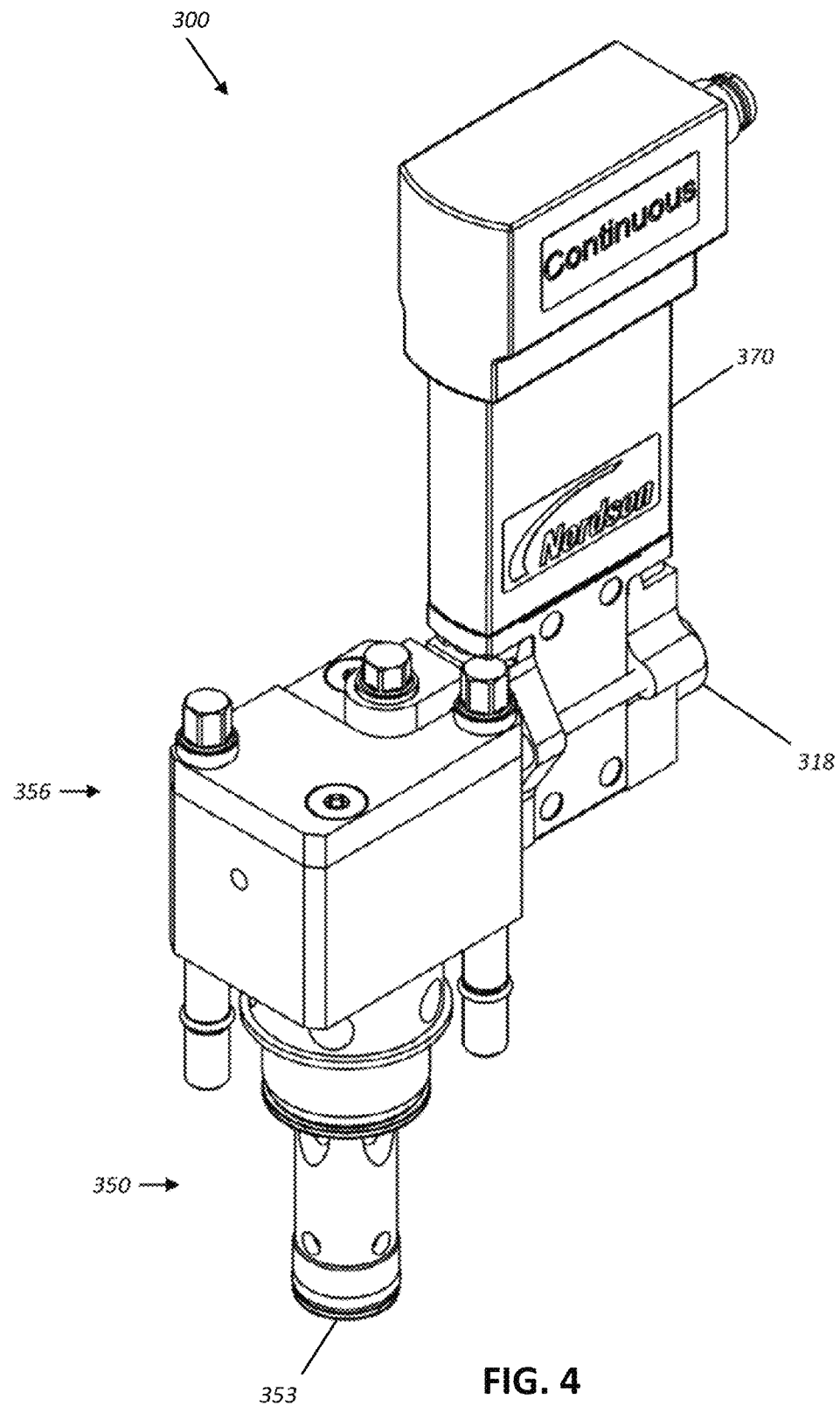
FIG. 4 illustrates a perspective view of a dispensing assembly according to an aspect of the disclosure.
Figure 5:
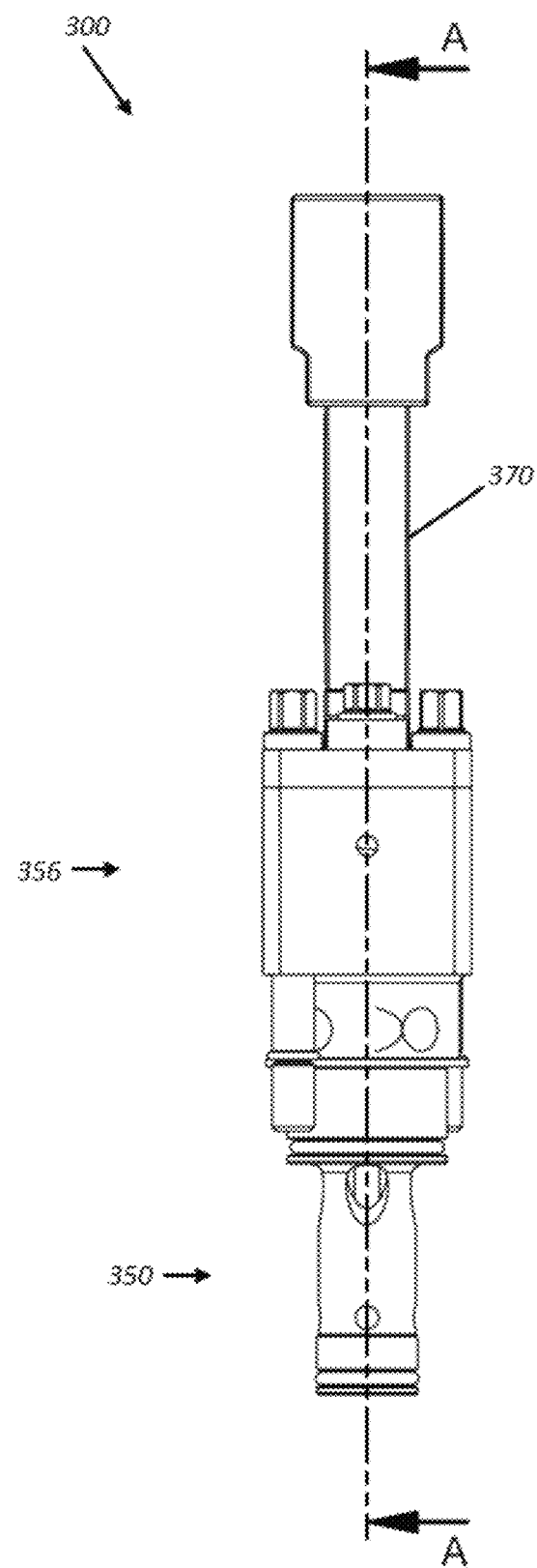
FIG. 5 illustrates a front plan view of the dispensing assembly of FIG. 4.
Figure 6:
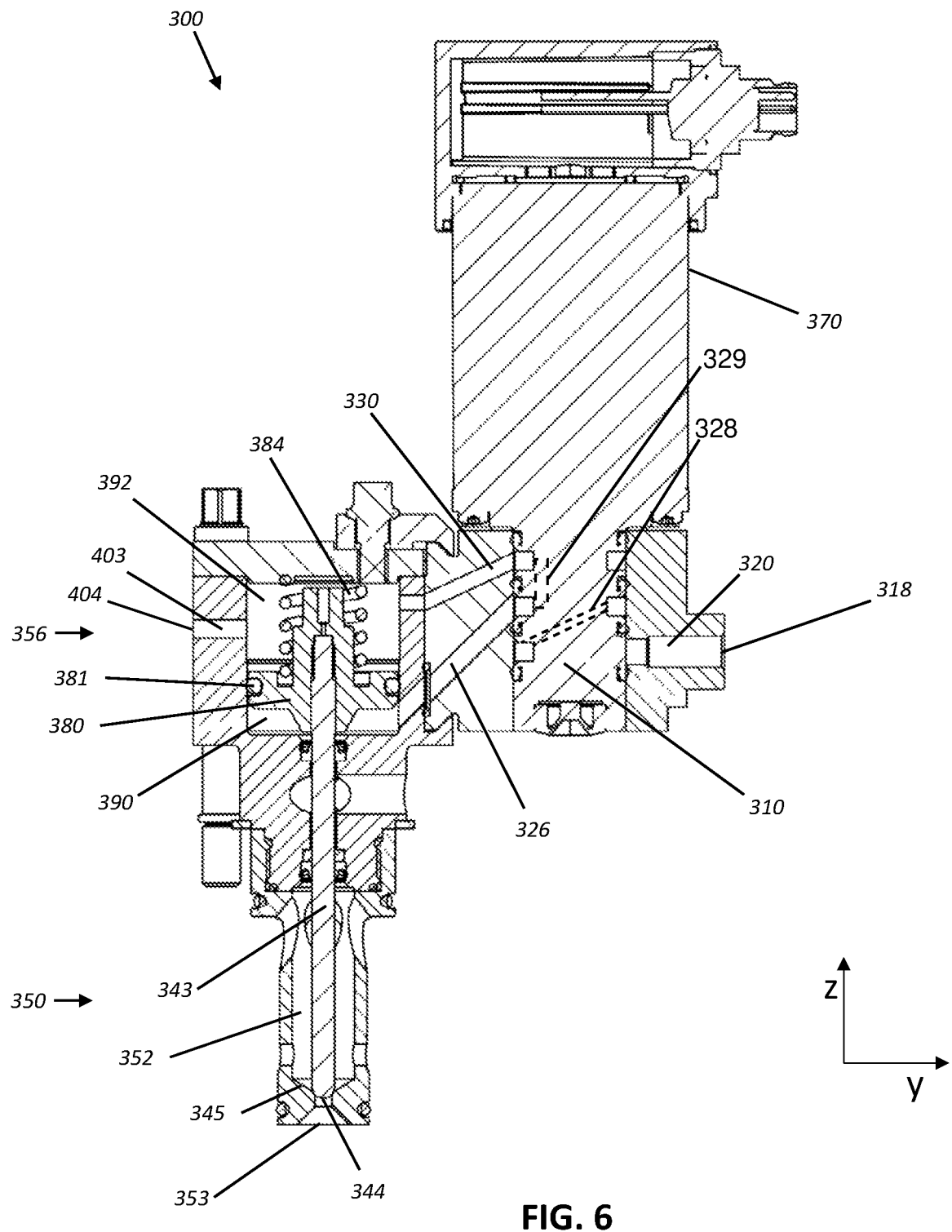
FIG. 6 illustrates a side cross-sectional view of the dispensing assembly of FIGS. 4 and 5 along the A-A cross section shown in FIG. 5.
Figure 7:
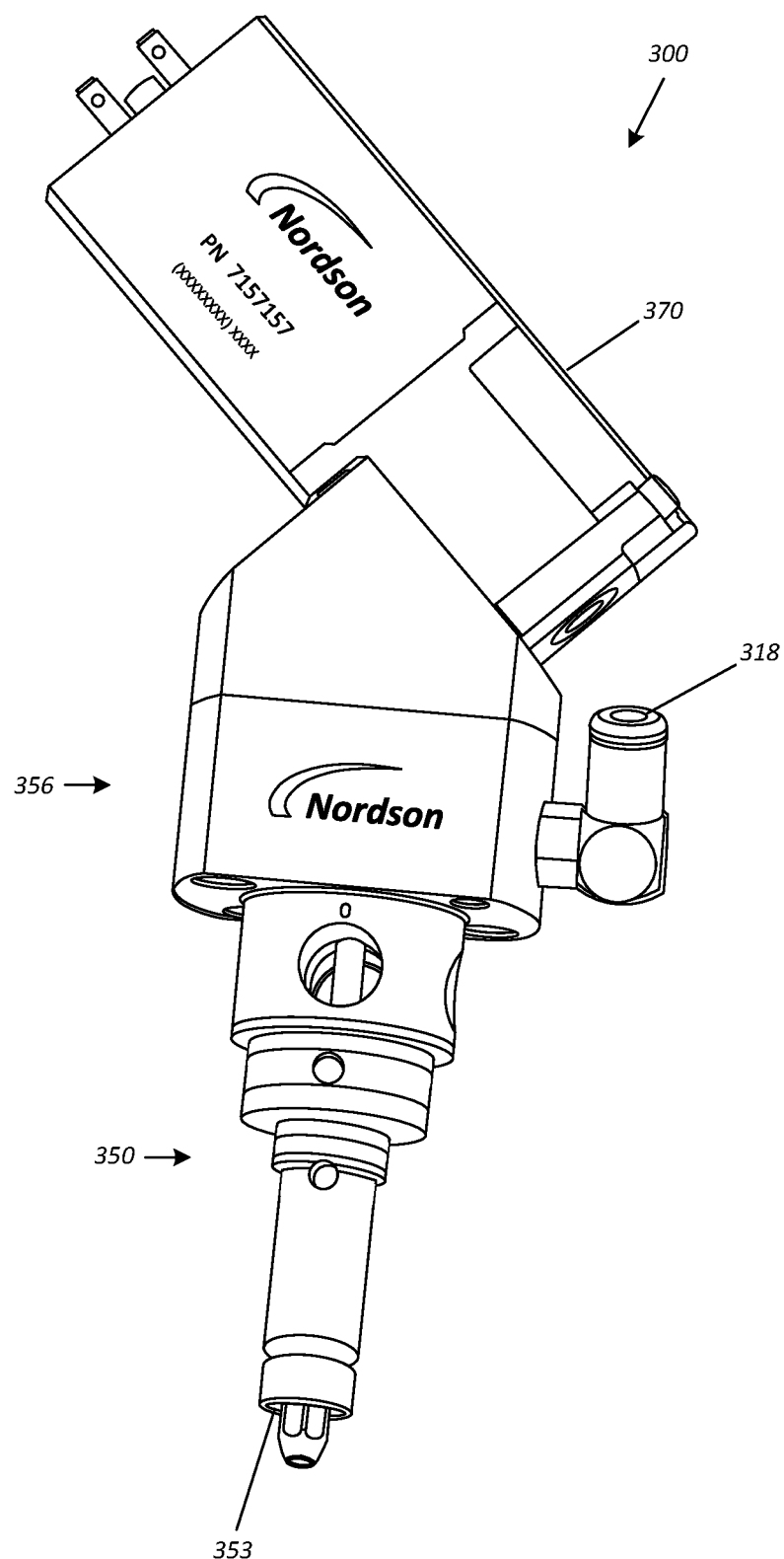
FIG. 7 illustrates a perspective view of a dispensing assembly according to another aspect of the disclosure.

A preferred embodiment of a dispensing valve 300 according to another aspect is depicted in FIGS. 4-6. FIGS. 7-10 depict an alternative embodiment of a dispensing valve 300. Features described above relating to other aspects are incorporated with respect to the aspects described below, and like-referenced elements may have some or all of the same features and capabilities as described above. Some features described with respect to FIGS. 1-3 may be similar to, or interchangeable with, those described in reference to FIGS. 4-6 and FIGS. 7-10. Furthermore, some features described with respect to FIGS. 4-6 may be similar to, or interchangeable with, those described in reference to FIGS. 7-10.

Referring to FIGS. 4-6, the dispensing valve 300 includes a liquid dispensing portion 350 and an actuation portion 356. As shown in FIG. 6, the liquid dispensing portion 350 defines a chamber 352 configured to receive the liquid to be dispensed from a liquid source (not shown). An outlet 353 is defined on the dispensing valve 300 and extends through the liquid dispensing portion 350 to fluidly communicate with the chamber 352. A valve stem 343 is disposed at least partly in the chamber 352 and is configured to reciprocate within the dispensing valve 300 to allow or prevent exit of the liquid in the chamber 352 from the dispensing valve 300.

A valve stem tip 344 is located at a distal end of the valve stem 343. The valve stem tip 344 is configured to move relative to a valve seat 345 on the liquid dispensing portion 350. The valve seat 345 may be adjacent to the outlet 353. When the valve stem 343 is moved in a first direction, the valve stem tip 344 does not contact the valve seat 345 and is spaced away therefrom, and when the valve stem 343 is moved in a second direction opposite the first direction, the valve stem tip 344 contacts the valve seat 345. When the valve stem tip 344 contacts the valve seat 345, the outlet 353 is blocked (i.e. closed), and liquid that is in the chamber 352 is prevented from moving out of the dispensing valve 300. When the valve stem tip 344 is spaced apart from the valve seat 345 and does not contact the valve seat 345, the outlet 353 is unblocked (i.e. open), and the liquid in the chamber 352 is permitted to exit the dispensing valve 300 through the outlet 353.

The valve stem 343 is rigidly attached to a piston 380 disposed in the actuation portion 356. The piston 380 is movable within the actuation portion 356 and is configured to move the fixedly attached valve stem 343. The actuation portion 356 defines a first chamber 390 and a second chamber 392 separated from the first chamber 390 by an airtight seal 381. In some aspects, the airtight seal 381 may be an O-ring and may be disposed on or adjacent to the piston 380. The piston 380 is configured to move the valve stem 343 to a first position and to a second position, wherein liquid is permitted to be dispensed from the dispensing valve 300 in one of the first and second positions, and liquid is prevented from being dispensed in the other of the first and second positions. The piston 380 may be configured to cause the valve stem 343 to move only into the first position from the second position, only into a second position from the first position, or into either the first or the second position. Other or additional actuation components can be utilized, for example, a spring element configured to bias the piston 380 or the valve stem 343 in the first or the second direction.

Movement of the piston 380 may be controlled by pressurized air that is introduced into the dispensing valve 300. Referring still to FIG. 6, the piston 380 is operationally in communication with the first chamber 390. Pressurized air can be directed into the first chamber 390 to communicate with the piston 380. When a predetermined amount of pressurized air is introduced into the first chamber 390 such that a threshold pressure is reached, the piston 380 may be moved in a first direction due to the built-up pressure in the first chamber 390. When the pressure in the first chamber 390 is below the threshold pressure, the piston 380 may remain immobile or may move back in a second direction opposite the first direction. A spring 384 may be disposed in the actuation portion 356 to bias the piston 380 in the second direction. The spring 384 may have a biasing force that acts on the piston 380, and the biasing force has to be overcome by the built-up pressure in the first chamber 390 to move the piston 380. In some aspects, the threshold pressure is greater than the biasing force of the spring 384.

When the piston 380 is moved in the first direction, the connected valve stem 343 also moves in the first direction such that the valve stem tip 344 is moved away from the valve seat 345. When the piston 380 is moved in the second direction, the valve stem 343 moves in the second direction such that the valve stem tip 344 is moved towards the valve seat 345 to contact the valve seat 345. It will be appreciated that other connections are possible between the piston 380 and the valve stem 343, and that opposite movements are included in this disclosure. For example, in some aspects, the movement of the piston 380 in the first direction may correspond to movement of the valve stem 343 in the second direction, and vice versa.

The piston 380 is configured to be moved by the pressurized air received in the first chamber 390. Movement of the pressurized air is controlled by a solenoid valve 370 affixed to the dispensing valve 300, for example to the actuation portion 356. The solenoid valve 370 is configured to modulate pressurized air through the dispensing valve 300 and to direct the pressurized air to one or more destinations within the actuation portion 356. The solenoid valve 370 may have a moveable poppet 310 configured to direct the pressurized air. Pressurized air enters the dispensing valve 300 from a pressurized air source at an air inlet 318. The pressurized air travels along an air inlet passage 320 from the air inlet 318 to the solenoid valve 370. The solenoid valve 370 uses the moveable poppet 310, or an equivalent movable element, to direct the pressurized air that enters from the air inlet passage 320. The moveable poppet 310 may be similar in function and/or structure to the poppet 210 described above.

The dispensing valve 300 may utilize pressurized air to move the piston 380 only in the first direction, only in the second direction, or reciprocate between moving the piston 380 in the first and second directions. In some aspects, the solenoid valve 370 may have a first, actuation configuration, in which the pressurized air is directed to move the piston 380, and a second, exhaust configuration, in which the pressurized air is directed to leave the dispensing valve 300 without causing movement of the piston 380.

In the actuation configuration, the poppet 310 may be moved to a first position, in which the air inlet passage 320 is in fluid communication with a first channel 326 via a solenoid air pathway 328 (represented schematically with dashed lines in FIG. 6) in the poppet 310 that fluidly communicates with both the air inlet passage 320 and the first channel 326. The first channel 326 extends from the solenoid valve 370 to the first chamber 390 and is in fluid communication with the first chamber 390. The pressurized air is thus permitted to move from the air inlet passage 320, through the solenoid valve 370, through the first channel 326, and into the first chamber 390. When the pressure in the first chamber 390 reaches a predetermined threshold, the piston 380 is moved in the first direction in response to the pressure of the pressurized air.

In the exhaust configuration, the moveable poppet 310 may be moved to a second position, in which the air inlet passage 320 is not in fluid communication with the first channel 326. The air inlet passage 320 may be in fluid communication with another pathway within the solenoid valve 370 (for example, one that leads outside of the dispensing valve 300 to atmosphere). In some aspects, the air inlet passage 320 may terminate at the solenoid valve 370, such that air is precluded from moving out of the air inlet passage. The pressurized air may remain in the air inlet passage 320 between the solenoid valve 370 and the air inlet 318 until a pathway is opened for the pressurized air to be moved out of the air inlet passage 320.

In the exhaust configuration, when the poppet 310 is in the second position, the first channel 326 is in fluid communication with a second channel 330 via a solenoid air pathway 329 (represented schematically with dashed lines in FIG. 6) in the poppet 310. The second channel 330 extends from the solenoid valve 370 to the second chamber 392. The second channel 330 is in fluid communication with the second chamber 392. In the exhaust configuration, the pressurized air that is present in the first chamber 390 is permitted to move through the first channel 326, through the poppet 310, through the second channel 330, and into the second chamber 392. As the pressurized air is moved from the first chamber 390, the pressure within the first chamber 390 decreases. The decrease in pressure may allow the piston 380 to move in the second direction as described above. In some aspects, movement of the piston 380 in the second direction may be caused by the biasing force of the spring 384 that acts on the piston 380. The spring 384 may be disposed within the second chamber 392, but it will be appreciated that the spring 384 may be arranged elsewhere in the actuation portion 356. In some aspects, when the poppet 310 is moved to the second position and the first channel 326 moves into fluid communication with the second channel 330 and with the second chamber 392, the pressurized air within the first chamber 390 may be forced out of the first chamber 390 into the first channel 326 by movement of the piston 380 in the second direction. This movement may be caused by the biasing force of the spring 384 acting on the piston 380. In the exhaust configuration, the air inlet passage 320 is not in fluid communication with either the first channel 326 or the second channel 330. As such, pressurized air from the air inlet passage 320 is not being moved into the first chamber 390 or the second chamber 392 when the dispensing valve 300 is in the exhaust configuration.

The second chamber 392 defines one or more exhaust passages 403 in fluid communication with the second chamber 392. The exhaust passage 403 defines an exhaust outlet 404 on the dispensing valve 300. Pressurized air that is directed into the second chamber 392 by the solenoid valve 370 moves into the one or more exhaust passages 403 and exists from the dispensing valve 300 at the exhaust outlets 404 into the atmosphere. Referring to the illustrative aspect of FIGS. 4-6, the dispensing valve 300 may have one exhaust passage 403 and respective implementations of the exhaust outlet 404. It will be understood that the dispensing valve 300 may have a different number of exhaust passages 403 and corresponding implementations of the exhaust outlets 404, for example, 1, 2, 3, . . . , 10 or another suitable number. In some aspects, the dispensing valve 300 may have between 1 and 8 exhaust passages 403 and corresponding implementations of the exhaust outlets 404 (inclusive); between 1 and 6 (inclusive); between 1 and 4 (inclusive); between 1 and 3 (inclusive); or another suitable number. For example, referring to the exemplary alternative embodiment of FIGS. 7-10, the dispensing valve 300 may have four exhaust passages 403 and four respective implementations of the exhaust outlets 404.

While the above description depicts the first chamber 390 and the second chamber 392 as being associated with actuation of the piston 380 and exhaust of the pressurized air, respectively, it will be understood that this arrangement can be reversed and will depend on the structure of the dispensing valve, specifically that of the valve stem tip 344 and the valve seat 345, as well as on the engagement between the piston 380 and the valve stem 343. The disclosed mechanism can be used with a normally-closed valve configuration (in which the valve stem tip 344 contacts the valve seat 345 unless an actuation member moves the valve stem tip 344 away from the valve seat 345) or with a normally-open valve configuration (in which the valve stem tip 344 is spaced apart from the valve seat 345 and only contacts the valve seat 345 when an actuation member moves the valve stem tip 344 towards the valve seat 345).

The one or more exhaust passages 403 and exhaust outlets 404 may have a substantially round cross section, but it will be appreciated that another shape can be used, for example, oval or rectangular. The one or more exhaust passages 403 and exhaust outlets 404 may all have the same dimensions, or they may have different sizes. Referring again to the exemplary embodiment of FIGS. 7-10, for example, the exhaust passages 403 have the same dimensions. The one or more exhaust passages 403 and the one or more respective implementations of the exhaust outlets 404 may have any suitable cross-sectional size, for example, between about 0.1 mm to about 3 mm, about 0.5 mm to about 2.5 mm, and about 1.0 mm to about 2.0 mm. In some aspects, the cross-sectional size may be about 1.5 mm.

The combined cross-sectional area of all exhaust outlets 404 (one or more exhaust outlets 404) may add up to a predetermined desired value. The predetermined desired value may depend on the specific system in which the dispensing valve 300 will be used, and the present disclosure is not limited to a particular configuration. It will be appreciated that to arrive at the desired value, the size of the exhaust passages 403 and exhaust outlets 404 may be changed, the number of the exhaust passages 403 and exhaust outlets 404 may be changed, or both the size and the number may be changed. Based on the exemplary ranges of possible number of exhaust outlets 404 and exhaust passages 403 described above, in some aspects, the combined cross-sectional area may be between about 0.00785 mm (in embodiments having a single implementation of the corresponding implementations of the exhaust outlets 404 and exhaust passage 403 that has approximately 0.1 mm diameter) and about 70.06858 mm (in embodiments having 10 exhaust outlets 404 and exhaust passages 403 that each have approximately 3 mm diameter). It will be appreciated that the total cross-sectional area may be calculated based on the specific quantity of exhaust outlets 404 and exhaust passages 403 as described above and based on the specific cross-sectional diameter of each exhaust outlet 404 and exhaust passage 403 as described above.

Figure 8:
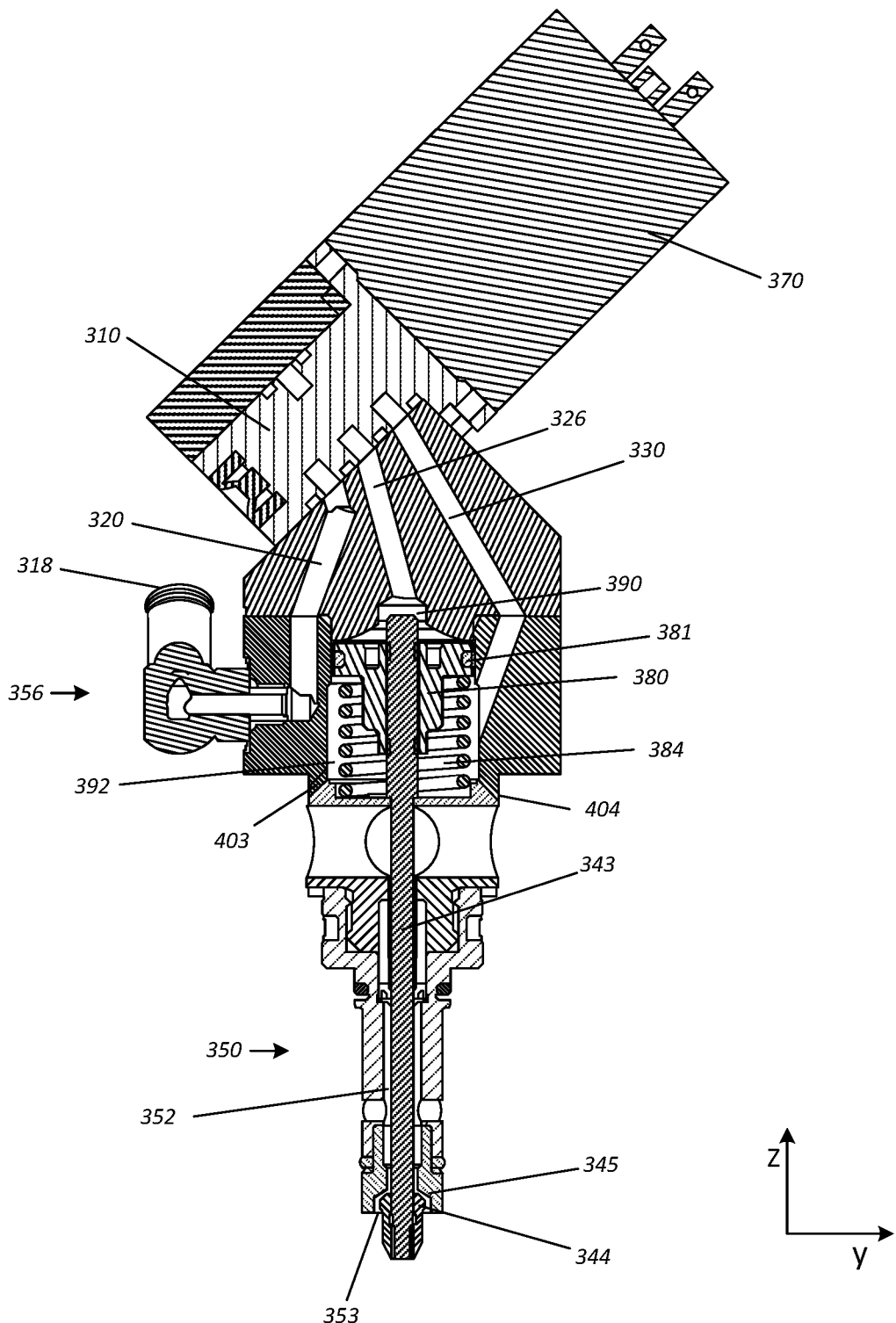
FIG. 8 illustrates a side cross-sectional view of the dispensing assembly of FIG. 7.
Figure 9:
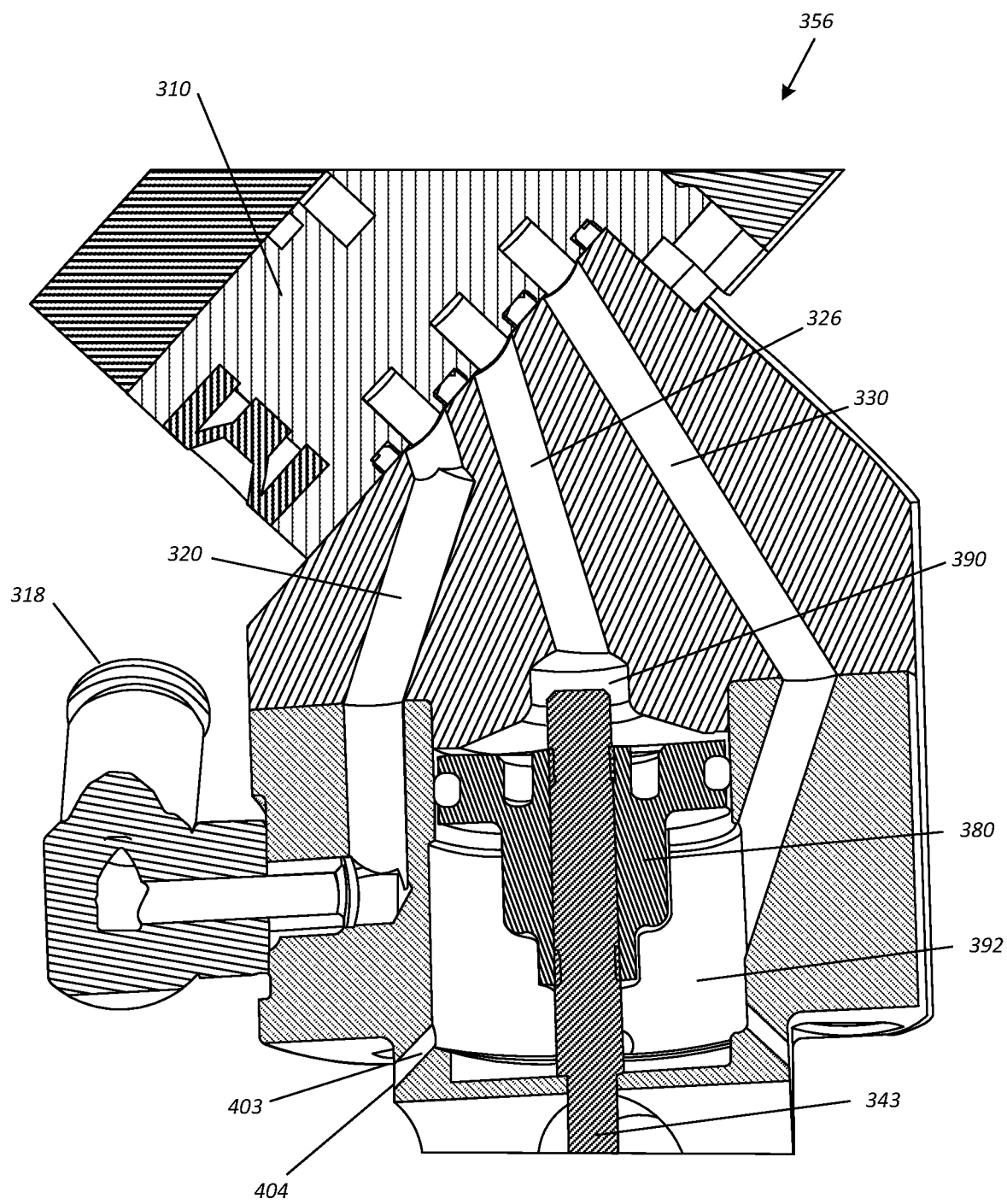
FIG. 9 illustrates a side cross-sectional view of an actuation portion of the dispensing assembly of FIGS. 7 and 8 according to an aspect of the disclosure.
Figure 10:
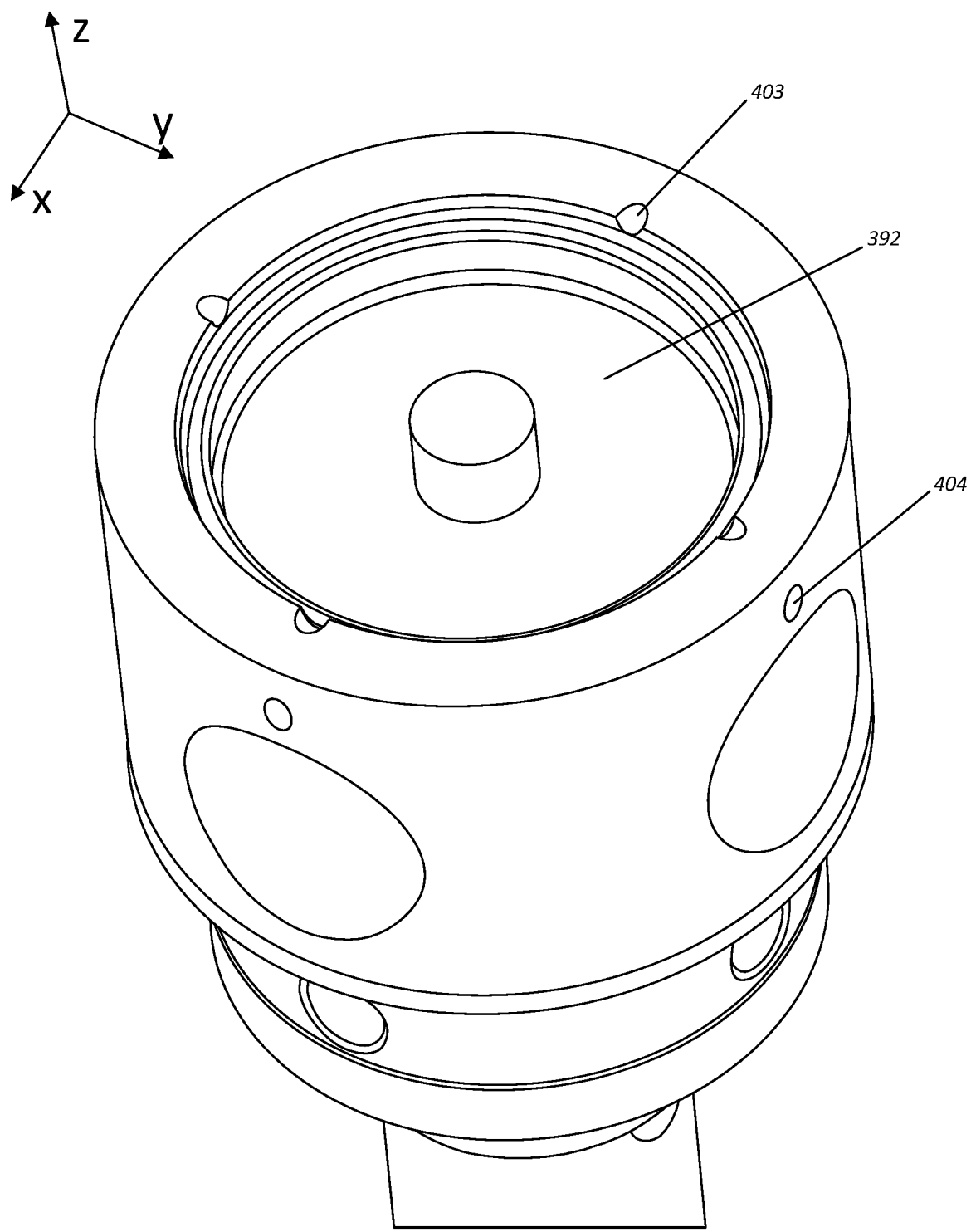
FIG. 10 illustrates a top perspective view of a second chamber of the dispensing assembly of FIGS. 7-9 according to an aspect of the disclosure.

Referring to the exemplary aspects of FIGS. 7-10, the four depicted implementations of the exhaust passage 403 are disposed circumferentially around the liquid dispensing portion 350. The exhaust passages 403 can be spaced with equal distances between adjacent passages (see specifically FIG. 10). In the plane perpendicular to the first and second direction of movement of the piston 380 (for example, an x-y-plane shown in FIG. 10), the exhaust passages 403 may be disposed about 90 degrees apart from each other. When looking at a plane parallel to the first and second direction of movement of the piston 380 (for example, a y-z-plane shown in FIGS. 8 and 10), the angle of the exhaust passages 403 from the second chamber 392 to the exhaust outlet 404 can be any suitable value, for example between about 0 degrees and 90 degrees. In some aspects, as can be seen in FIGS. 8 and 9, the exhaust passage 403 extends at about 45 degrees from the second chamber 392 to the exhaust outlet 404. It will be understood that other angles can be used and may depend on the number of exhaust passages 403, their sizes, the intended use of the dispensing valve 300, and manufacturing constraints.

The quantity and the size of the exhaust passages 403 in the second chamber 392 may affect the amount of noise associated with the air leaving the dispensing valve 300. The larger the exhaust passages 403 and exhaust outlets 404, and the greater their quantity, the less noise is produced when the pressurized air passes therethrough to the atmosphere.

However, in some aspects, it is not desirable to have fewer exhaust passages 403 that are larger than a predetermined size because larger openings would increase the risk of pollutants or particles entering the second chamber 392 when the pressurized air is not being expelled therefrom. In preferred aspects, the exhaust passages 403 and exhaust outlets 404 are dimensioned such that they are large enough to allow the pressurized air to leave the second chamber 392 without surpassing a desired noise threshold, but small enough to preclude undesired particles from entering the dispensing valve 300.

An exemplary method of operating a dispensing assembly according to aspects of this disclosure may include a step of introducing liquid to be dispensed into the chamber 352. The method further includes the step of actuating the piston 380 to move the piston 380 and the valve stem 343 from an initial position (e.g. the first position) to a different position (e.g. the second position) to cause the liquid to be dispensed from the chamber 352. The step of moving the piston 380 may include the step of introducing pressurized air into the first chamber 390 via the mechanisms described throughout this disclosure, for example, via the first channel 326. The method may further include the step of ceasing introduction of the pressurized air into the first chamber 390. In some aspects, this may cause the piston 380 and the valve stem 343 to return to the initial position in which they were disposed prior to the step of introducing pressurized air into the first chamber 390. The method may further include a step of introducing the pressurized air into the second chamber 392 via the mechanisms and channels described throughout this disclosure, for example, via the second channel 330. This step may include moving the moveable poppet 310 such that a fluid communication is formed between the first channel 326 and the second channel 330, such that the pressurized air within the first chamber 390 is permitted to move via the first channel 326 into the second channel 330, and into the second chamber 392. The method may further include discharging the pressurized air from the second chamber 392 outside of the dispensing assembly via one or more exhaust passages 403. In some aspects, the method may further include the step of actuating the piston 380 and the valve stem 343 to move back to its initial position, for example, by permitting a spring 384 to force the piston 380 to move. Alternatively, this step may be performed via buildup of pressure in the second chamber 392 caused by the pressurized air within the second chamber 392 that acts on the piston 380, as described previously. Any one or multiple steps above may be repeated in the dispensing process.

Aspects depicted throughout this disclosure allow for the pressurized air to be moved out of the dispensing valve 300 at an acceptable noise level. As such, a noise reducing element or muffler is not required. Noise reducing elements and mufflers in existing systems serve to reduce the noise level associated with the pressurized air being moved to the atmosphere. The noise reducing elements and mufflers are subject to clogging over continued use. As the noise reducing elements clog, they result in reduced flow rates of the pressurized air therethrough. The gradual decrease in pressurized air flow rate is difficult to quantify and predict, and so the operation of the existing dispensing valves may be hard to control and may lead to inconsistent dispensing of materials. Due to the decrease in air exhaustion, there is a subsequent decrease in the quantity of material that can be dispensed from the system, which slows down production. To partially alleviate this problem, in existing systems, the noise reducing element has to be replaced when it becomes clogged or damaged, which further decreases efficiency and increases required operational time. In some existing systems, the noise reducing element is replaced every 50 million cycles.

The aspects described throughout this specification are advantageous because, since a noise reducing element is not needed, the cycle time of the dispensing valves is consistent over the lifetime of the system. The cycle times are not influenced by the undesirable clogging of the non-existent noise reducing element. The disclosed aspects eliminate having to replace or clean the noise reducing element, thus decrease downtime. Furthermore, the inclusion of exhaust passages 403 and exhaust outlets 404 helps reduce noise, thus negating the need for a discrete noise reducing element while maintaining the advantages of noise reduction. Some aspects of the dispensing systems disclosed throughout this application are explicitly devoid of a muffler or other noise reducing element.

The dispensing valves described herein can be manufactured to have various numbers and dimensions of the exhaust passages 403 and the exhaust outlet 404. The manufacturing constraints will depend on the anticipated use of the dispensing valve and the amount of noise that the system generates.

It will be understood that additional components commonly used in the field of fluid dispensing can be utilized with the disclosed embodiments. For example, in some aspects, the dispensing valve 300 may further include a process air source configured to contain process air. A supply channel, through which the process air is moved from the process air source, may be disposed on the dispensing valve 300 and configured to be operatively connected to a process air nozzle. The process air nozzle may be disposed relative to the dispensing valve 300 such that the process air can be applied to the liquid being dispensed from the dispensing valve 300.

While systems and methods have been described in connection with the various aspects of the various figures, it will be appreciated by those skilled in the art that changes could be made to the aspects without departing from the broad inventive concept thereof. It is understood, therefore, that this disclosure is not limited to the particular aspects disclosed, and it is intended to cover modifications within the spirit and scope of the present disclosure as defined by the claims.

What is claimed is:

1. A dispensing assembly for dispensing a liquid onto a substrate, the dispensing assembly comprising:
    a housing configured to receive the liquid to be dispensed;
    a valve stem disposed in the housing and having a first configuration in which the liquid is allowed to exit the housing and a second configuration in which the liquid is prevented from exiting the housing;
    a control valve configured to receive pressurized air from a pressurized air source, the control valve being movable between a first position and a second position;
    an exhaust passage defined on the housing and having a predetermined cross-sectional area, the exhaust passage being configured to receive the pressurized air therein;
    a first chamber;
    a first channel being disposed between the first chamber and the control valve, the first channel being in fluid communication with the first chamber, and the first channel being in fluid communication with the control valve when the control valve is in the first position;
    a second chamber that is separate from the first chamber and is in fluid communication with the exhaust passage; and
    a second channel that is disposed between the second chamber and the control valve,
    wherein when the control valve is in the first position, the pressurized air is configured to act on the valve stem to cause the valve stem to move to the first configuration or to the second configuration, and when the control valve is in the second position, the pressurized air acting on the valve stem is configured to be moved into the exhaust passage and out of the dispensing assembly through the exhaust passage,
    wherein when the control valve is in the first position, the control valve is configured to receive the pressurized air from the pressurized air source and to discharge the pressurized air into the first channel, whereby the control valve is configured to be in fluid communication with the first chamber and configured to direct the pressurized air to the first chamber,
    wherein when the control valve is in the second position, the control valve is configured to be in fluid communication with the second chamber, and is further configured to direct the pressurized air from the first chamber to the second chamber via the second channel, wherein the exhaust passage is configured to fluidly communicate with the second chamber, and whereby when the control valve is in the second position, the pressurized air that is present in the first chamber is permitted to move through the first channel, through the control valve, through the second channel, and into the second chamber.

2. The dispensing assembly of claim 1, wherein the second channel is in fluid communication with the second chamber, and the second channel is in fluid communication with the control valve when the control valve is in the second position, wherein, when the control valve is in the second position, the control valve is configured to receive the pressurized air from the first chamber through the first channel and to discharge the pressurized air into the second channel.

3. The dispensing assembly of claim 2, wherein when the control valve is in the first position, the pressurized air source is not in fluid communication with the second channel.

4. The dispensing assembly of claim 2, wherein when the control valve is in the second position, the pressurized air source is not in fluid communication with either the first channel or the second channel.

5. The dispensing assembly of claim 1, wherein when the control valve is in the second position, the control valve is configured to prevent the pressurized air to move from the pressurized air source to either the first chamber or the second chamber.

6. The dispensing assembly of claim 1, further comprising a valve seat defined on the housing, wherein the valve stem is configured to move relative to the valve seat, such that when the valve stem is in the first configuration, the valve stem is spaced away from the valve seat, and when the valve stem is in the second configuration, the valve stem contacts the valve seat.

7. The dispensing assembly of claim 1, wherein the control valve is a solenoid valve.

8. The dispensing assembly of claim 1, wherein a pressure of the pressurized air is between 1 bar and 10 bar.

9. The dispensing assembly of claim 1, wherein the exhaust passage is oriented at an angle between parallel to the valve stem and perpendicular to the valve stem.

10. The dispensing assembly of claim 1, wherein the exhaust passage has a cross-sectional diameter of between 0.1 mm and 3.0 mm.

11. The dispensing assembly of claim 1, wherein the dispensing assembly defines a plurality of exhaust passages.

12. The dispensing assembly of claim 11, wherein the predetermined cross-sectional area includes a combined cross-sectional area of all exhaust passages in the plurality of exhaust passages.

13. The dispensing assembly of claim 11, wherein the dispensing assembly defines four exhaust passages arranged circumferentially around the dispensing assembly.

14. The dispensing assembly of claim 1, further comprising a spring configured to bias the valve stem in a direction, wherein the valve stem is movable by the pressurized air opposite a direction of bias of the spring.

15. The dispensing assembly of claim 1, wherein the dispensing assembly is devoid of a muffler operationally attached thereto.

16. The dispensing assembly of claim 1, wherein the second chamber and the second channel are each defined in the housing.

17. The dispensing assembly of claim 1, wherein the second channel is directly connected to the second chamber, and the exhaust passage is directly connected to the second chamber.

18. The dispensing assembly of claim 1, wherein the second chamber is larger than the first chamber when the control valve is in the second position, whereby a piston separating the first chamber from the second chamber moves along a first direction that extends from the second chamber to the first chamber thereby reducing a size of the first chamber.

19. A dispensing system for dispensing a liquid onto a substrate, the dispensing system comprising:

a liquid source configured to hold the liquid to be dispensed;

a dispensing assembly having a housing configured to receive the liquid from the liquid source, the dispensing assembly further having a valve stem movable within the housing between a first configuration, in which the liquid is allowed to exit the housing, and a second configuration, in which the liquid is prevented from exiting the housing;

a pressurized air source configured to hold pressurized air; and a control valve configured to receive pressurized air from the pressurized air source, the control valve being movable between a first position and a second position;

an exhaust passage defined on the housing and having a predetermined cross-sectional area, the exhaust passage being configured to receive the pressurized air therein;

a first chamber;

a first channel that is disposed between the first chamber and the control valve, the first channel being in fluid communication with the first chamber, and the first channel being in fluid communication with the control valve when the control valve is in the first position;

a second chamber that is separate from the first chamber and is in fluid communication with the exhaust passage; and a second channel that is disposed between the second chamber and the control valve, wherein when the control valve is in the first position, the pressurized air is configured to act on the valve stem to cause the valve stem to move to the first configuration or to the second configuration, and when the control valve is in the second position, the pressurized air acting on the valve stem is configured to be moved into the exhaust passage and out of the dispensing assembly through the exhaust passage, wherein when the control valve is in the first position, the control valve is configured to receive the pressurized air from the pressurized air source and to discharge the pressurized air into the first channel, whereby the control valve is configured to be in fluid communication with the first chamber and configured to direct the pressurized air to the first chamber, wherein when the control valve is in the second position, the control valve is configured to be in fluid communication with the second chamber, and is further configured to direct the pressurized air from the first chamber to the second chamber via the second channel, wherein the exhaust passage is configured to fluidly communicate with the second chamber, and whereby when the control valve is in the second position, the pressurized air that is present in the first chamber is permitted to move through the first channel, through the control valve, through the second channel, and into the second chamber.

20. The dispensing system of claim 19, wherein the liquid is hot melt adhesive.

21. The dispensing system of claim 19, further comprising a heater configured to heat the liquid to a predetermined temperature.

22. The dispensing system of claim 19, further comprising:
a process air source configured to contain process air; and
a supply channel through which the process air is moved from the process air source, the supply channel having a process air nozzle disposed relative to the dispensing assembly such that the process air can be applied to the liquid being dispensed from the dispensing assembly.

23. The dispensing system of claim 19, wherein the second channel is in fluid communication with the second chamber, and the second channel is in fluid communication with the control valve when the control valve is in the second position,
wherein, when the control valve is in the second position, the control valve is configured to receive the pressurized air from the first chamber through the first channel and to discharge the pressurized air into the second channel.

24. The dispensing system of claim 23, wherein when the control valve is in the first position, the pressurized air source is not in fluid communication with the second channel.

25. The dispensing system of claim 23, wherein when the control valve is in the second position, the pressurized air source is not in fluid communication with either the first channel or the second channel.

26. The dispensing system of claim 19, wherein when the control valve is in the second position, the control valve is configured to prevent the pressurized air to move from the pressurized air source to either the first chamber or the second chamber.

27. The dispensing system of claim 19, further comprising a valve seat defined on the housing, wherein the valve stem is configured to move relative to the valve seat, such that when the valve stem is in the first configuration, the valve stem is spaced away from the valve seat, and when the valve stem is in the second configuration, the valve stem contacts the valve seat.

28. The dispensing system of claim 19, wherein the control valve is a solenoid valve.

29. The dispensing system of claim 19, wherein a pressure of the pressurized air is between 1 bar and 10 bar.

30. The dispensing system of claim 19, wherein the exhaust passage is oriented at an angle between parallel to the valve stem and perpendicular to the valve stem.

31. The dispensing system of claim 19, wherein the exhaust passage has a cross-sectional diameter of between 0.1 mm and 3.0 mm.

32. The dispensing system of claim 19, wherein the dispensing assembly defines a plurality of exhaust passages.

33. The dispensing system of claim 32, wherein the predetermined cross-sectional area includes a combined cross-sectional area of all exhaust passages in the plurality of exhaust passages.

34. The dispensing system of claim 32, wherein the dispensing assembly defines four exhaust passages arranged circumferentially around the dispensing assembly.

35. The dispensing system of claim 19, further comprising a spring configured to bias the valve stem in a direction, wherein the valve stem is movable by the pressurized air opposite a direction of bias of the spring.

36. The dispensing system of claim 19, wherein the dispensing assembly is devoid of a muffler operationally attached thereto.

37. The dispensing system of claim 19, wherein the second channel is directly connected to the second chamber, and the exhaust passage is directly connected to the second chamber.

38. The dispensing system of claim 19, wherein the second chamber is larger than the first chamber when the control valve is in the second position, whereby a piston separating the first chamber from the second chamber moves along a first direction, that extends from the second chamber to the first chamber, thereby reducing a size of the first chamber.

39. A dispensing assembly for dispensing a liquid onto a substrate, the dispensing assembly comprising:
a dispensing portion having a liquid inlet and a liquid outlet, the dispensing portion defining a liquid chamber configured to receive the liquid therein from the liquid inlet;
a valve seat adjacent to the liquid outlet;
a valve stem disposed in the liquid chamber and configured to move within the liquid chamber;
a valve stem tip defined at a distal end of the valve stem and configured to selectively contact the valve seat and be spaced away from the valve seat;
an actuation portion having an air inlet configured to receive pressurized air therethrough, the actuation portion defining a first chamber and a second chamber that is separate from the first chamber;
a piston disposed in the actuation portion, the piston being movable by the pressurized air;
a control valve configured to direct the pressurized air selectively either to the first chamber or to the second chamber;
an exhaust passage configured to discharge the pressurized air therethrough from the dispensing assembly; and
a first channel that is disposed between the first chamber and the control valve, the first channel being in fluid communication with the first chamber, and the first channel being in fluid communication with the control valve when the control valve is in a first position; and
a second channel that is disposed between the second chamber and the control valve,
wherein the control valve has a first configuration and a second configuration, the control valve in the first configuration being configured to direct the pressurized air to the first chamber, the control valve in the second configuration being configured to direct the pressurized air to the second chamber,
wherein when the control valve is in the first configuration, the pressurized air in the first chamber acting on the valve stem is configured to act on the piston and configured to cause the piston to move in a first direction due to the pressurized air acting thereon, and
wherein when the control valve is in the second configuration, the exhaust passage is configured to receive the pressurized air therein and to discharge the pressurized air out of the dispensing assembly,
wherein when the control valve is in the first position, the control valve is configured to receive the pressurized air from a pressurized air source and to discharge the pressurized air into the first channel, whereby the control valve is configured to be in fluid communication with the first chamber and configured to direct the pressurized air to the first chamber, wherein when the control valve is in a second position, the control valve is configured to be in fluid communication with a second chamber that is separate from the first chamber, and is further configured to direct the pressurized air from the first chamber to the second chamber via the second channel, wherein the exhaust passage is configured to fluidly communicate with the second chamber, and whereby when the control valve is in the second position, the pressurized air that is present in the first chamber is permitted to move through the first channel, through the control valve, through the second channel, and into the second chamber.

40. The dispensing assembly of claim 39, wherein the exhaust passage has a predetermined cross-sectional area.

41. The dispensing assembly of claim 40, comprising a plurality of exhaust passages, wherein a quantity and dimensions of the plurality of exhaust passages reduces noise of operation of the dispensing assembly relative to a single exhaust passage.

42. The dispensing assembly of claim 41, wherein the predetermined cross-sectional area includes a combined cross-sectional area of all exhaust passages in the plurality of exhaust passages.

43. The dispensing assembly of claim 39, further comprising a spring configured to bias the piston in a second direction opposite the first direction, wherein when the pressurized air is moved into the first chamber, the pressurized air is configured to cause the piston to move in the first direction when a threshold pressure of the pressurized air is reached, the threshold pressure being greater than a bias of the spring.

44. The dispensing assembly of claim 39, wherein the control valve is a solenoid valve having a poppet movable between a first position and a second position, wherein when the poppet is in the first position, the control valve is in the first configuration, and when the poppet is in the second position, the control valve is in the second configuration.

45. The dispensing assembly of claim 39, wherein the liquid outlet is blocked when the valve stem tip is in contact with the valve seat, such that the liquid is prevented from moving out of the dispensing assembly, and where the liquid outlet is unblocked when the valve stem tip is spaced away from the valve seat, such that the liquid is allowed to be moved out of the dispensing assembly.

46. The dispensing assembly of claim 39, wherein the dispensing assembly is devoid of a muffler.

47. The dispensing assembly of claim 39, wherein the second channel is directly connected to the second chamber, and the exhaust passage is directly connected to the second chamber.

48. The dispensing assembly of claim 39, wherein the second chamber is larger than the first chamber when the control valve is in the second position, whereby the piston separating the first chamber from the second chamber moves along a second direction, that is opposite the first direction and extends from the second chamber to the first chamber, thereby reducing a size of the first chamber.

49. A method of dispensing a liquid from a dispensing assembly, the method comprising:

introducing liquid to be dispensed into a liquid chamber, the liquid chamber including a movable valve stem configured to move between a first position, in which liquid is precluded from being discharged out of the liquid chamber, and a second position, in which liquid is permitted to be discharged from the liquid chamber;

introducing pressurized air into a first chamber via a control valve, when the control valve is in a first position, so as to cause the movable valve stem to move from the first position to the second position due to the pressurized air, wherein the pressurized air is introduced into a first channel configured to fluidly communicate with the control valve and with the first chamber;

ceasing introduction of the pressurized air into the first chamber; and moving the pressurized air out of the dispensing assembly when the control valve is in a second position, wherein when the control valve is in the second position the pressurized air is moved from the first chamber to a second chamber separated from the first chamber, and the pressurized air is moved into a second channel configured to fluidly communicate with the control valve and the second chamber.

50. The method of claim 49, wherein introducing pressurized air into the first chamber causes movement of a piston affixed to the movable valve stem, such that when the piston moves, the movable valve stem moves.

51. The method of claim 49, wherein the step of moving the pressurized air out of the dispensing assembly further includes moving the pressurized air from the second chamber out of the dispensing assembly via an exhaust passage.

52. The method of claim 51, wherein the step of moving the pressurized air out of the second chamber includes moving the pressurized air out of a plurality of exhaust passages.

53. The method of claim 49, wherein the step of moving the pressurized air out of the dispensing assembly includes discharging the pressurized air directly to an atmosphere from the dispensing assembly without moving the pressurized air through a muffler.

54. The method of claim 49, further comprising moving the movable valve stem from the second position back to the first position.

55. The method of claim 54, wherein moving the movable valve stem back to the first position includes forcing the movable valve stem into the first position with a spring configured to act on the movable valve stem.

56. The method of claim 49, wherein the second channel is directly connected to the second chamber, and wherein moving the pressurized air out of the dispensing assembly includes moving the pressurized air out of an exhaust passage that separate from the first chamber and is directly connected to the second chamber.

57. The method of claim 49, wherein the second chamber is larger than the first chamber when the control valve is in the second position, whereby a piston separating the first chamber from the second chamber moves along a first direction, that extends from the second chamber to the first chamber, thereby reducing a size of the first chamber.

\* \* \* \* \*